United States Patent [19]
Pariso

[11] 3,929,156
[45] Dec. 30, 1975

[54] FLOAT VALVE
[76] Inventor: Pasquale P. Pariso, 222 Bloomer Ave., Elmira, N.Y. 14901
[22] Filed: Nov. 20, 1973
[21] Appl. No.: 417,517

[52] U.S. Cl. ............................................... 137/444
[51] Int. Cl.² ........................................ F16K 31/24
[58] Field of Search ........... 137/426, 434, 436, 437, 137/442, 444; 251/118, 120, 122, 238; 285/4

[56] References Cited
UNITED STATES PATENTS

| | | | |
|---|---|---|---|
| 1,223,170 | 4/1917 | Hodgson | 137/426 |
| 2,390,134 | 12/1945 | Svirsky | 251/120 |
| 2,730,122 | 1/1956 | Svirsky | 137/437 |
| 3,339,215 | 9/1967 | Flood | 285/4 X |
| 3,480,299 | 11/1969 | Henderson | 285/4 |
| 3,797,518 | 3/1974 | Holm | 137/434 |
| 3,807,689 | 4/1974 | Booth | 251/238 |

*Primary Examiner*—Henry T. Klinksiek
*Attorney, Agent, or Firm*—Elton Brown, Jr.

[57] ABSTRACT

An improved float valve is provided that includes a shank that can be cut off to a desired length to fit water closet tanks of different sizes. There is further provided slots or windows in the valve body and wherein a skirt surrounds the window slots to help assure that the water entering the tank will be properly controlled. The float valve can be adjusted to different positions in the water closet tank.

1 Claim, 5 Drawing Figures

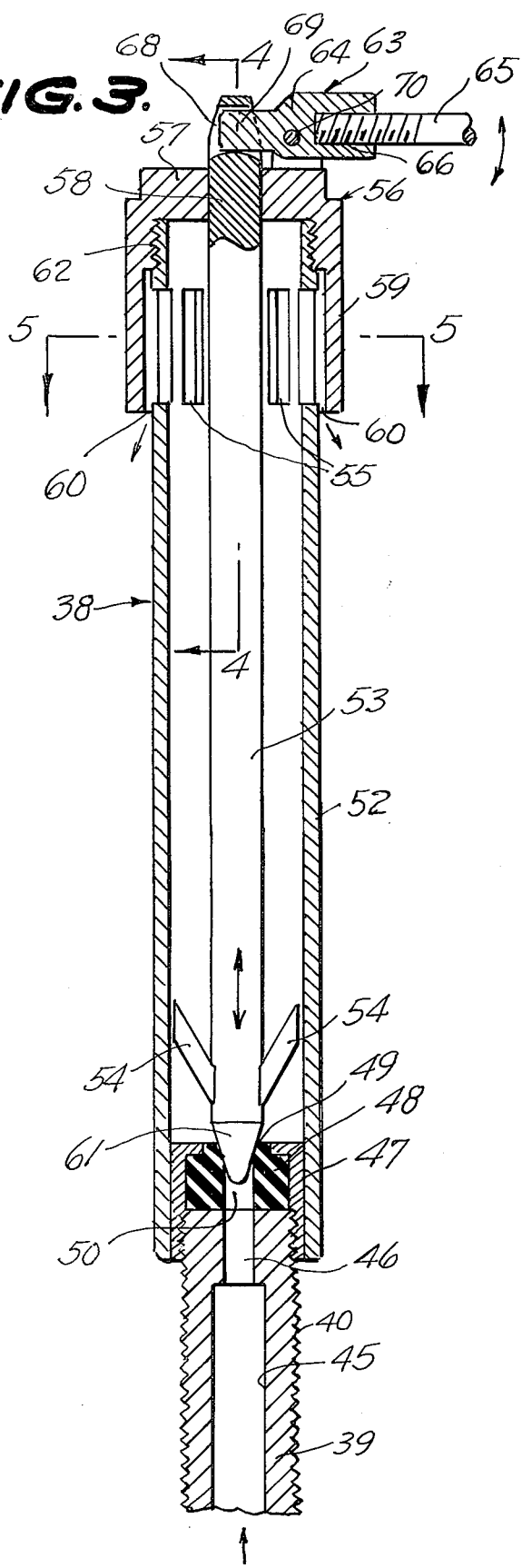
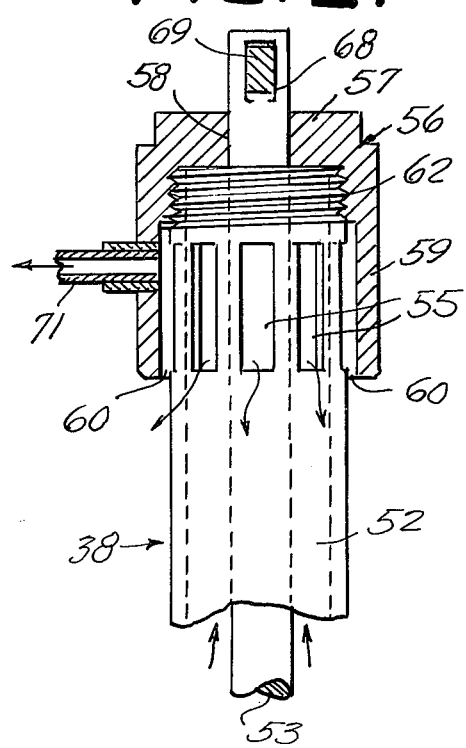
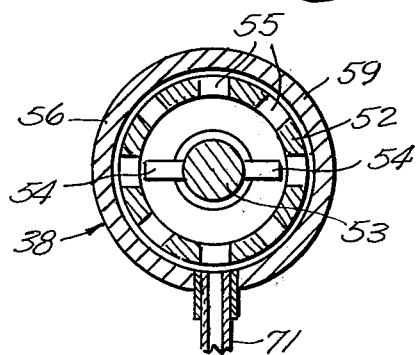

FLOAT VALVE

BACKGROUND OF THE INVENTION

FIELD OF THE INVENTION

The present invention relates to water closets, and more particularly to an improved float valve for a water closet.

SUMMARY OF THE INVENTION

An improved float valve is provided that includes an elongated shank that has pre-formed grooves or rings therein so that the shank can be readily cut off at any desired length whereby the unit can be conveniently mounted in different sizes or types of tanks. In addition, there is provided in the valve body a plurality of slots or windows that are surrounded by a skirt so that the water leaving the valve body will be directed in the proper direction and under the desired amount of pressure with a silent action. The valve rod has prongs thereon to prevent the valve rod from vibrating during its movement. The present invention is an improvement over prior float valves such as that shown in prior U.S. Pat. No. 2,890,709.

The primary object of the present invention is to provide an improved silent float valve that will fit water closet tanks of different sizes or capacities, and wherein there is provided an improved means for controlling the flow of water through the valve body into the tank.

Still another object of the present invention is to provide a water closet silent float valve that is ruggedly constructed and foolproof in use and which is simple and inexpensive to manufacture.

Other objects and advantages will become apparent in the following specification when considered in the light of the attached drawings.

BRIEF DESCRIPTION OF THE DRAWINGS

FIG. 3 is an enlarged sectional view taken on the line 3—3 of FIG. 1;

FIG. 4 is a fragmentary sectional view taken on the line 4—4 of FIG. 3; and

FIG. 5 is a sectional view taken on the line 5—5 of FIG. 3.

DESCRIPTION OF THE PREFERRED EMBODIMENT

Figure 1:
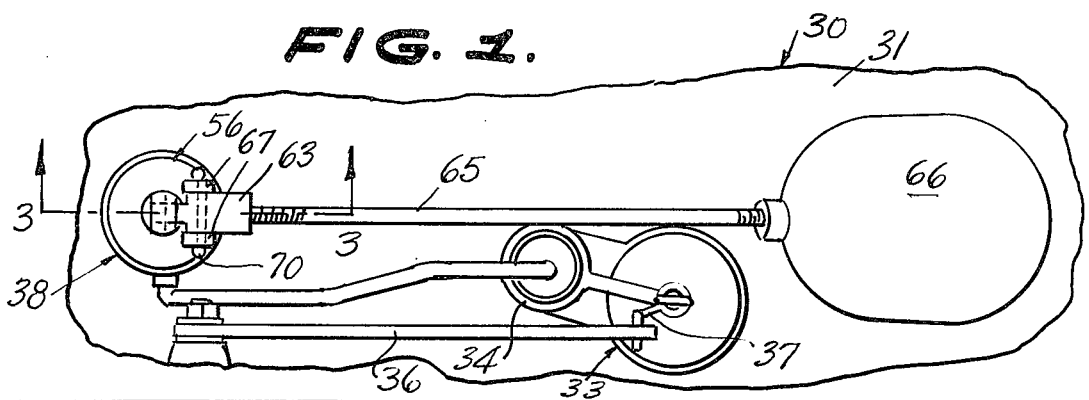
FIG. 1 is a fragmentary top plan view illustrating the silent float valve of the present invention.
Figure 2:
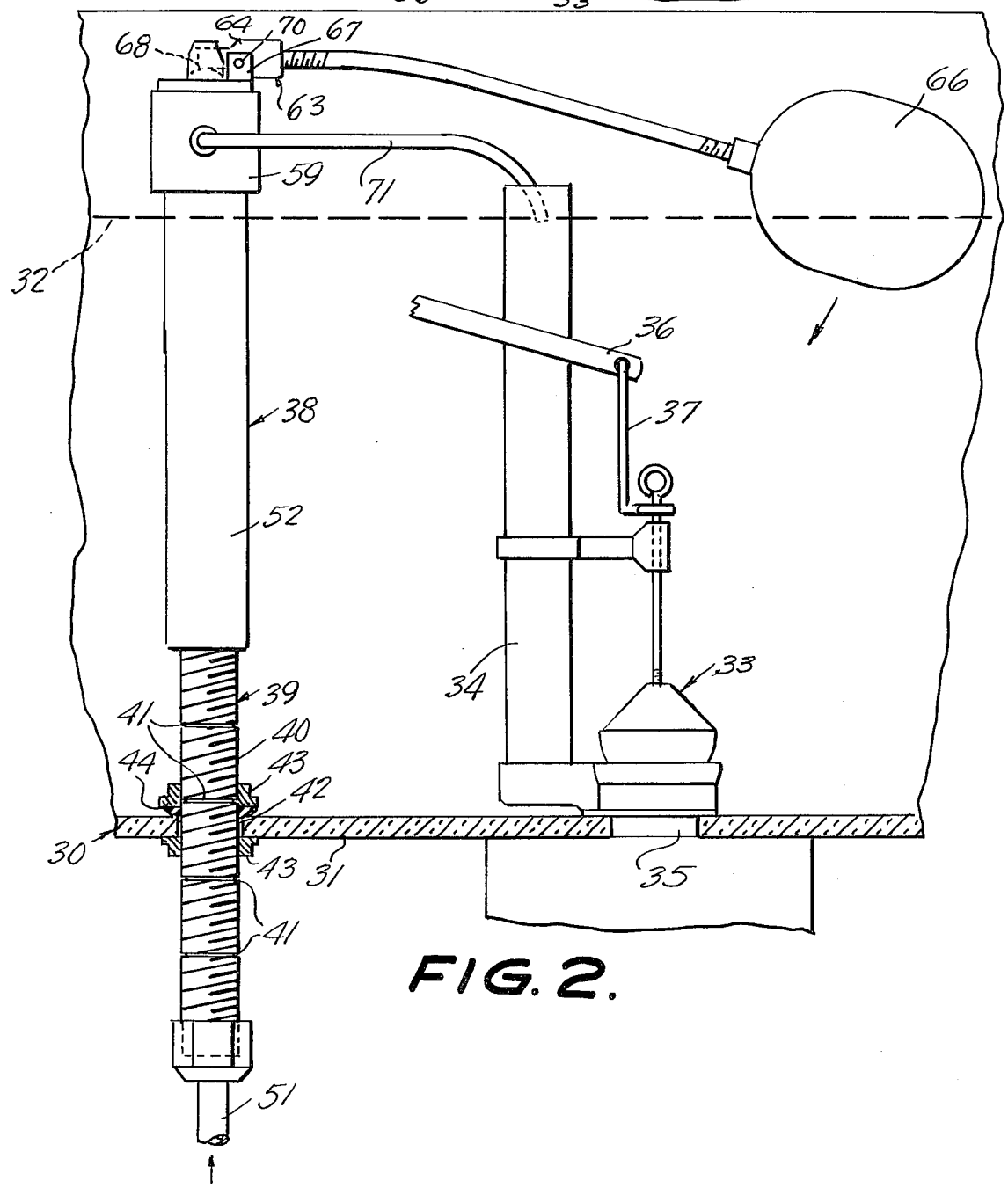
FIG. 2 is a side elevational view thereof, with parts broken away in section.

Referring now to the drawings in detail, the numeral 30 indicates a portion of a water closet tank that includes a bottom wall 31 that is horizontally disposed, and in FIG. 2 the numeral 32 indicates the water level in the tank 30. The numeral 33 indicates the usual float valve assembly that may include an upstanding pipe 34, outlet opening 35, actuating rod 36, and links or rods 37.

In accordance with the present invention, there is provided an improved silent float valve that is indicated generally by the numeral 38, and the float valve 38 includes a vertically disposed externally threaded shank 39 that has external threads 40 therein. As shown in FIG. 2, the shank 39 is provided with a plurality of spaced apart rings or annular grooves 41 so that the shank 39 can be readily cut off at any of the grooves 41 in order to permit the float valve 38 to be installed in different sizes or types of water closet tanks. The bottom wall 31 of the tank is provided with an opening 42 through which the shank 39 extends, and coupling nuts 43 are arranged in threaded engagement with the threaded portion 40 of the shank 39 for maintaining the device in its proper assembled position.

The numeral 44 indicates a washer that can be provided for maintaining a water tight fit between the shank and the bottom wall 31.

As shown in FIG. 3, for example, the shank 39 is provided with a longitudinally extending hollow interior or passageway 45 that communicates with a reduced diameter passageway 46 in the upper end of the shank 39, and the numeral 47 indicates a fitting that is arranged in threaded engagement with the upper end of the shank 39. The fitting 47 has a bushing 48 therein, and the bushing 48 is provided with a port or passageway 50 that communicates with the passageway 46, the upper portion of the passageway 50 defining or providing a seat 49. The numeral 51 indicates a pipe or line that serves to connect the lower end of the shank 39 to a suitable source of water that is to be used during the flushing of the toilet.

As shown in the drawings, there is provided a cylindrical valve body 52 that has the fitting 47 mounted in the lower end thereof and the numeral 53 indicates a movable or reciprocating valve rod that extends through the stationary valve body 52. The valve rod 53 has inclined prongs 54 secured to the lower portion thereof as shown in the drawings, and these prongs or guide members 54 help prevent the rod 53 from vibrating as it moves up and down in the valve body 52. The numeral 61 indicates a tapered valve element or end portion on the lower end of the valve rod 53, and the valve element 61 is mounted for movement into and out of opened and closed relation with respect to the seat 49.

Arranged in the upper portion of the valve body 52 is a plurality of vertically disposed spaced parallel window slots 55. The numeral 56 indicates a top piece or body member that is arranged in threaded engagement with the threaded portion 62 of the valve body 52. The body member or cap 56 includes a top section 57 that has a central opening 58 therein for the projection therethrough of the upper end of the valve rod 53. The body member 56 includes a cylindrical skirt portion 59 that surrounds the window slots 55, and the skirt 59 is spaced slightly outwardly from the window slots and valve body whereby there is defined or provided in the lower portion thereof a space 60 for the egress therethrough of water. The skirt portion 59 serves to assure that the water entering the tank from the slots 55 will enter in a silent fashion or manner.

The numeral 63 indicates a rocker arm that includes a support piece 64 that has a rod 65 connected thereto, and the rod 65 is adapted to have a float 66 on its outer end. The support piece 64 is pivotally or rockably connected to ears or lugs 67 on the member 56, by means of a pivot pin 70. The member 64 includes a projecting portion 69 that extends into an opening 68 that is formed in the upper end of the valve rod 53.

The numeral 71 indicates a line that is connected to the float valve 38 as shown in the drawings, and the other end of the line or tube 71 extends into the upper end of the pipe 34.

From the foregoing, it will be seen that there has been provided an improved silent float valve that is an improvement of a prior float valve such as that shown in prior U.S. Pat. No. 2,890,709. The silent float valve 38 of the present invention is adapted to be used in a water closet and is precisely fitted, long wearing, and silent in action.

In use, with the parts arranged as shown in the drawings, it will be seen that the shank 39 can be extended through the opening 42 in the bottom wall 31, and the coupling nuts 43 are arranged inside and outside of the tank to maintain the device in its proper position. Water is adapted to be supplied through the pipe 51 from a suitable source of supply, and this water can flow up through the passageway 45 and then through the passageway 46 and into the port or passageway 50. When the toilet is flushed, the float 66 will move downwardly as the level of water 32 recedes, so that as the float 66 moves downwardly the rocker arm 63 will lift the valve rod 53 to raise the valve element 61 from the seat 49 whereby the water can then flow from the opening 50 past the seat 49 and then through the hollow valve body 52 and some of this water can then flow out through the window slots 55, and through the space 60 to replenish or replace the water in the tank 30. When the water level reaches the point 32, the float 66 will again close the valve element 61 on the seat 49 so that no further water can enter the tank 30. The line or conduit 71 is arranged as shown in the drawing so that overflow can enter the top of the pipe 34.

The valve rod 53 has the inclined prongs 54 secured thereto or formed integral therewith so that as the valve rod 53 moves up and down in the valve body 52, the prongs 54 will prevent vibration or chattering of the valve rod in the valve body. In addition, the slots 55 are arranged in such a manner and in conjunction with the skirt 59 so that the water that leaves the slots 55 will be guided downwardly by the skirt 59 out through the space 60 so that the water will be discharged with the proper amount of pressure to assure that the float valve 38 functions in a silent manner.

The parts can be made of any suitable material and in different shapes or sizes as desired or required.

As shown in FIG. 2, slots or indentations 41 are precut around the circumference of the valve shank 39 approximately every one-half inch for the purpose of adjusting the height of the valve. Thus, when the device is being used in a short tank, the shank can be cut the proper length at a particular slot or recess 41, and when being used in a longer tank, the shank can be cut at a different location. The device is constructed so that it can be readily disassembled when desired. For example, to disassemble the float valve 38, the pin 70 can be removed whereby the rocking arm can be disconnected.

The windows 55 allow water to flow through the windows in the vicinity of the skirt 59, and air can pass through the slots during use of the device. The skirt 59 over the valve windows permits the valve to function in the desired manner so that the device will be very quiet or silent in its operation, and in addition, this construction creates the proper amount of pressure to refill the bowl. The element 47 can be pressed into the lower end of the valve body 52. The pair of coupling nuts 43 are arranged so that one is positioned inside of the tank and the other is on the outside in order to lock the valve into the tank in the proper manner. The coupling nuts 43 can be loosened to permit the shank 39 to be raised or lowered to the desired height. The top of the float valve is adapted to set approximately one inch above the water line 32 as shown in FIG. 2 in order to assure the anti-siphon action. The shank 39 is made of extra length so that it will fit all tanks of different heights. The long shank 39 is such that the shank can be cut off with a suitable saw or the like to permit the device to be mounted in different sizes of tanks. The prongs 54 prevent the valve rod from vibrating inside of the valve body.

Having thus described the preferred embodiment of the invention it should be understood that numerous structural modifications and adaptations may be resorted to without departing from the spirit of the invention.

What is claimed is:

1. In a float valve for a water closet tank of the type including a bottom wall having an opening therein, said float valve comprising a vertically disposed generally cylindrical hollow shank extending through the opening in said bottom wall and having a fluid passageway therethrough, a fitting detachably secured on the upper end of said shank, a bushing mounted in said fitting and having a fluid passageway therethrough communicating with the fluid passageway in said shank and having at its upper end a seat, a hollow valve body having said fitting in the lower end thereof, said valve body having a plurality of spaced parallel window slots in the upper portion thereof, a body member mounted on the upper end of said valve body, said body member having a cylindrical skirt spaced outwardly from the window slots providing a space for fluid to pass therethrough into said tank, said body member having an opening in the top thereof, a vertically disposed vertically moveable valve rod extending through the opening in said body member and through said valve body, a conically tapered valve element on the lower end of said valve rod adapted for movement into and out of open and closed relation with respect to the seat in said bushing, and a pair of guide prongs projecting integrally outwardly of opposite sides of said valve rod and sloping in a direction away from said valve element to guide the movement of said valve element into and out of engagement with said seat.

\* \* \* \* \*